Figure 1:
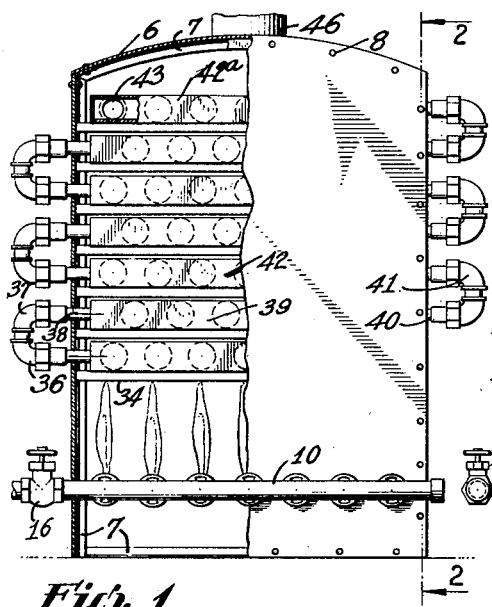

June 26, 1934.   W. F. FICKETT   1,963,960
WATER HEATER
Filed June 6, 1932

INVENTOR.
WINFIELD F. FICKETT,
BY
ATTORNEY.

Patented June 26, 1934

1,963,960

UNITED STATES PATENT OFFICE 1,963,960

WATER HEATER

Winfield F. Fickett, Los Angeles, Calif., assignor of one-half to James L. Ryan, Los Angeles, Calif.

Application June 6, 1932, Serial No. 615,637

1 Claim. (Cl. 122—316)

This invention relates to hot water heaters of a character adapted to deliver the maximum amount of hot water in a minimum of time. The inventor is aware that instantaneous heaters have been on the market for some time, but said instantaneous heaters are subject to abuse in the operating of the same. Instantaneous heaters also explode if not operated properly, and at the present time, as far the inventor is aware, very few instantaneous heaters are now upon the market.

The present invention is adapted to eliminate the dangers incident to instantaneous heaters, provides all the advantages that a storage heater might possess and still not store water in the sense that a tank is provided. Actual use of a demonstrating model of this invention has indicated that a relatively small device is capable of constantly supplying a flowing stream of water with heat units and, in fact, the experimental model referred to is capable of delivering over forty gallons of boiling water per minute. This renders a device of this character readily adaptable for bath houses, apartment houses, and the like.

The invention has for an object the provision of a hot water heater as distinguished from a boiler, in which the liability of "sanding", and the formation of rust is reduced to a minimum. Storage heaters are notorious for the fact that any sediment in the water drops to the bottom of the tank and after a time acts as a heat insulator to such an appreciable extent that a large quantity of gas must be burned in order to heat water within the tank at all. As a rule, the baffle or bottom of the heater tank must be removed and either cleaned or replaced. This fault in practically every existing storage heater is admitted by the industry. With the present invention, the likelihood of deleterious substances affecting the heater so as to render it an impractical device, is practically eliminated.

Another object of the invention is the provision of a heater so constructed that the fluid to be heated is constantly brought into contact with a hot member.

Another object is the provision of a heater for liquids such as water, wherein the said liquid is constantly passed through a heated member, the heated member being of relatively small cross sectional area in comparison to the storage tank of a storage water heater.

The present invention is thought to be novel in that a liquid, such as water, will enter the heater at a given zone and be conducted progressively through heated members within the heater and then outwardly therefrom. In a storage water heater, the water is "stored" as the term "storage heater" implies. The same might be deemed true for the ordinary radiator systems, in that water is circulated back and forth, which permits the water to deposit sediment wherever there is a hot surface because the water is in a closed circuit, whereas with my heater, the water enters at one zone and outwardly from another, and there is no recirculation. As a result, my heater will last for many years and requires practically no servicing.

Further objects of the invention consist in the provision of a hot water heater requiring a minimum number of parts so arranged that any defective parts may be readily replaced, a heater that does not require an expert for its installation or for its repair, which is highly efficient, utilizing the utmost of British thermal units in a burnable fluid, which is compact, sightly in appearance, fool-proof in operation, and readily adaptable for existing needs and conditions, either by the addition of further units or the enlargement of a single unit.

With the above and other objects in view, the invention consists in the novel and useful provision, formation, construction, association, and relative arrangement of parts, members and features, all as shown in a certain embodiment in the accompanying drawing, described generally, and more particularly pointed out in the claim.

Figure 2:
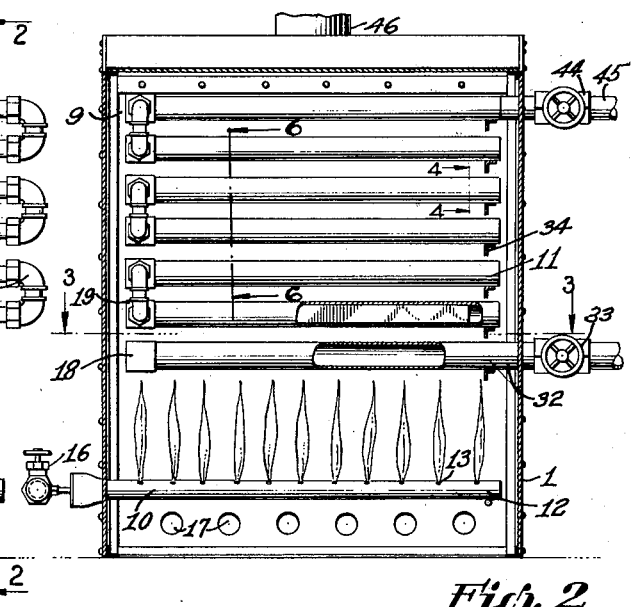
Figure 3:
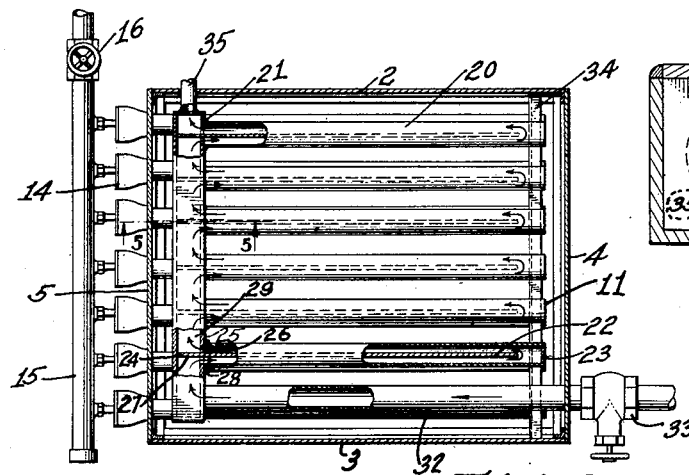
Figure 5:
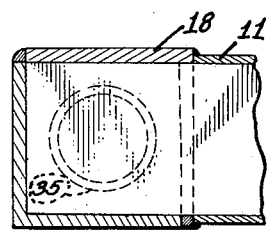
Figure 4:
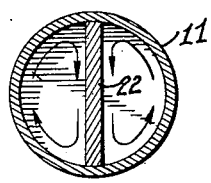
Figure 6:
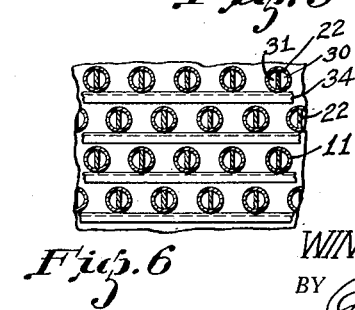

In the drawing:

Figure 1 is an end elevation, partly in section, of my improved heater,

Figure 2 is a longitudinal vertical section of my invention, taken on line 2—2 of Figure 1, and showing certain parts in elevation, Figure 3 is a horizontal section taken on line 3—3 of Figure 2, Figure 4 is a cross section of one of the heating tubes taken on line 4—4 of Figure 2, Figure 5 is a fragmentary vertical section taken on line 5—5 of Figure 3, through one of the heating tubes and manifolds, and, Figure 6 is a fragmentary vertical section taken on line 6—6 of Figure 2, showing the staggered relation of the heating tubes.

Referring now with particularity to the drawing, the improved water heater includes a casing 1 provided with side walls 2 and 3, end walls 4 and 5, and an arched type top wall 6. The said walls may be held in juxtaposition through the medium of various bracing elements, such as by the angle iron framing designated generally as 110

7, the casing members being held to said angle iron framing through the medium of rivets, screws, or the like 8. Preferably the interior of the casing is lined with some heat resistant material, such as asbestos fibre, or paper, kieselguhr, or any other material desired, as is here indicated at 9. Although I have not shown a base for the casing, it is understood that a base may be provided. This is particularly true if the said casing is mounted upon a supporting structure, such as legs. Where the casing is secured to a flooring, the base is not necessary.

Within the casing, I have provided the two necessary members required to properly heat the liquid, to-wit, a heating member 10 and a member 11 through which liquid is to be passed to be in turn brought to a definite heat by the member 10. The member 10 is conventional and is shown as being a gas burning device. In this instance, I have provided a plurality of spaced apart tubular burners 12 spaced slightly above the base of the casing, with all the said members provided with gas jets 13. The usual air mixers 14 are provided so that the proper amount of air is fed with the gas to produce the best flame when the gas is ignited at the jets. These mixer members are, of course, exterior the casing. A pipe 15 communicates with each individual burner pipe and a common control valve 16 regulates the amount of gas or burnable fluid delivered to the burners. For the purpose of further supplying air, I have provided a plurality of openings 17 in the side walls of the casing and situated below the burners.

The members 11 to be heated, in the present instance, comprise one or more tubes through which the liquid to be heated is passed. To take full advantage of the heat generated by the burner when the burner is in operation, I have arranged the tubes in tiers. I do not desire to restrict my invention to any given number of tiers, as in certain installations a single set of tubes might be sufficient. The first tier is shown at 18, and the next tier thereabove at 19. It will be noted that each tier comprises a plurality of parallel spaced tubes 20 all lying in the same plane and directly associated with what I term a distributing head or manifold 21. This distributing head or manifold might be a tube. The tubes 20 are identical in construction for all of the tiers and each tube contains a partition 22 diametrically disposed and longitudinally extending therein. One end of each tube is closed or capped, as shown at 23, and the partition spacedly terminates within the tube adjacent this end. The opposite end of the partition extends beyond the length of the tube, as shown at 24. The said distributing head or manifold is provided in one wall 25 with a plurality of transverse openings 26, it being noted in this regard that the said head is substantially square in cross section, and that that end of the tube which has the extended end 24 of the partition, communicates with the said opening 26, the partition end 24 being received within the head as shown at 27. Each tube is secured to the distributing head in any convenient manner, such as by brazing, or spot welding, indicated generally at 28. Thus, the said distributing head or manifold is formed with a plurality of chambers 29 communicating with contiguous half sections of contiguous pipes. For convenience, the divisional spaces or half sections are designated as 30 and 31. The tube 32 minus a partition directly communicates with the lowermost distributing head or manifold and through a valve 33 with a source of liquid supply, not shown. The tubes 20 adjacent the capped ends are supported in position by angle irons 34 associated with the framing. The distributing head or manifold end may be held in a like manner, although this particular portion may be supported through the medium of connectors between the manifolds to permit communication between each ascending tier.

Referring to Figure 3, a tube 35 communicates with the distributing head or manifold and is passed through an opening in the side wall 2 of the casing. Thus, this tube forms a support for the manifold end. This tube in turn through the medium of suitable U-connectors 36 and 37 is directly connected to tube 38 communicating with the interior of the next ascending manifold 39. It will be noted that the opposite end of this manifold 39 has a tube 40 extending therefrom and through the medium of suitable tube connections 41 communicates with a tube extending from the manifold 42 and so on, depending upon the number of members 11. When the last manifold 42a is reached, a tube 43 minus a partition wall leads outwardly from the casing and through a valve 44 to the outgoing service pipe 45. I have preferably arranged the tubes of each tier to the end that said contiguous tiers have the tubes thereof in staggered relationship, the stagger being so arranged that a tier of tubes will have the tube elements thereof lying substantially intermediate the tube elements of any contiguous tier. This construction is best illustrated in Figure 6. By so arranging the tubes, it is possible to take advantage of all the heat generated by the burner.

The top of the casing is provided with the usual flue 46, to the end that the unburned gases from the burner may be conducted upwardly and to the outer air.

The operation, uses and advantages of the invention just described are as follows:

While I have shown the various heating tubes as provided with a single partition, it is obvious that any type of partition may be provided for the purpose of segregating the said tubes into compartments. The principle of the invention largely resides in the proper circulatory movement of a liquid within the tubes, to the end that a comparatively small body of liquid is constantly presented during movement thereof to a large area maintained in a heated condition. The average storage heater is so constructed that a small area of a large body of water is in contact with a hot plate and the body of water is usually heated by convection. With my heater, I purposely heat the entire tube so that the body of water is forced to directly contact at all times with a heated surface and the liquid under pressure is moved through said tubes. It is noted that by partitioning the tube in the manner illustrated that substantially half-circular portions are presented within the tube. The base which would be formed by the partition is not curved. This arrangement causes water or other liquid during its longitudinal passage through each half portion of the tube to rotate transversely to its line of movement. It is intended that the arrows of Figure 4 should indicate this rotation of the liquid. It will, therefore, be seen that the liquid is constantly brought into contact with the heated tube during its longitudinal movement therethrough. When the valve 33 is open, and assuming that the device is to be used as a hot water heater, liquid will be passed into the first chamber of the manifold and into the portion 30 throughout the length of said tube and into the return portion 31, thence into the chamber 29 of the manifold, and so on for the remaining tubes. After the last tube has been passed through, the water is passed through the tube 35, the connector, and into the manifold of the next tier thereabove. If the valve 44 is opened, the liquid will continue its flow outwardly through the pipe 45. The flame from the burner will probably rise to a greater height than that shown in Figures 1 and 2, although it is obvious that the height of the flame will depend upon actual service conditions, and the usual thermostatic arrangement may be resorted to whereby the flow of fuel to each burner is discontinued until a temperature drop has been reached, whereupon through the medium of a pilot burner, the different burners are again ignited. This is ordinary practice.

It is, of course, understood that the manifold is divided into chambers by the extended partitions in the respective tubes.

It is thought that it is novel to sequentially circulate a body of liquid in two directions through a tube in such a manner that the liquid is in a measure rotated transversely of its direction of longitudinal movement through the tube, and in addition, to stagger different tiers of tubes, and to heat said tubes so that a large heated area is presented to the moving body of liquid. As was stated in the preamble, a small heater of this type successfully heats over forty gallons of continuously running water per minute.

While I have illustrated my invention in its simplest embodiment, yet it is to be understood that I may deviate from the description and drawing for the purpose of further refining the invention, and to make such changes as may be within the scope of the invention and the appended claim.

It is obvious that various changes and modifications and variations may be made in practicing the invention in departure from the particular showing of the drawing without departing from the true spirit thereof.

I claim:

A water heater comprising a casing, a plurality of superimposed tiers of heating tubes in said casing, each tier including a manifold connected to one end of the tubes thereof, partition plates extending across said manifold and into the tubes respectively connected thereto, dividing each tube into an inlet compartment and an outlet compartment, an inlet tube without a partition plate leading into the inlet end of the manifold of the inlet tier of tubes, an outlet tube without a partition plate leading from the outlet end of the manifold of the outer tier of tubes, means for connecting the manifolds of said tiers so that the water will circulate progressively through said tiers from the inlet tier through the outlet tier, and means for heating the water as it passes through said tubes.

WINFIELD F. FICKETT.